Aug. 14, 1962 P. LASHTA 3,049,367
VACUUM CLEANER CONNECTION HAVING RECIPROCATING COUPLING MEANS
Filed April 1, 1958 2 Sheets-Sheet 1
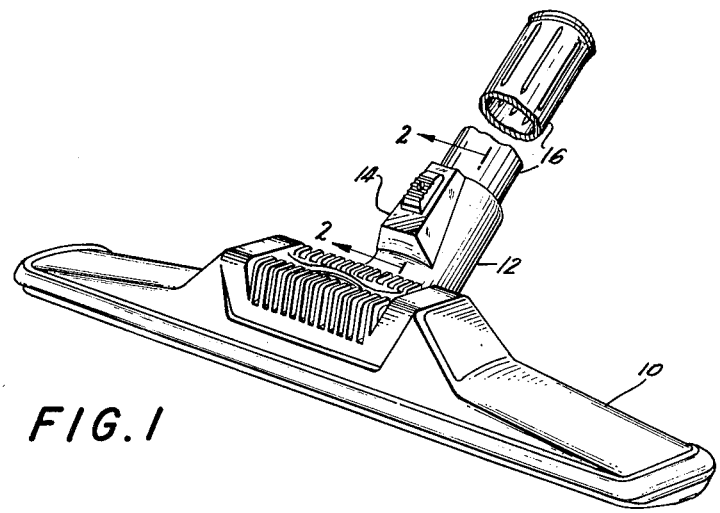
FIG. 1
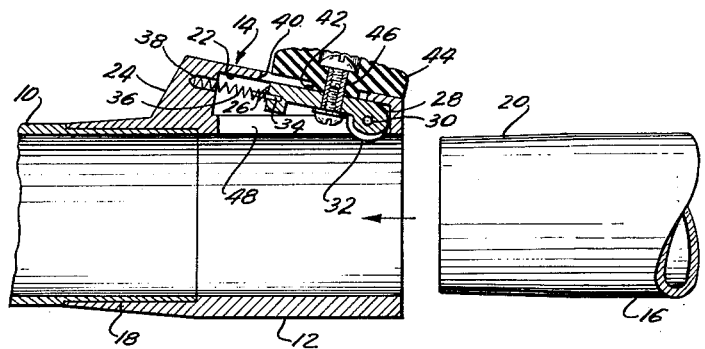
FIG. 2
FIG. 3
INVENTOR
Peter Lashta
BY
ATTORNEY Aug. 14, 1962  P. LASHTA  3,049,367
VACUUM CLEANER CONNECTION HAVING RECIPROCATING COUPLING MEANS
Filed April 1, 1958  2 Sheets-Sheet 2

INVENTOR
Peter Lashta
BY
his ATTORNEY

United States Patent Office 3,049,367
Patented Aug. 14, 1962

3,049,367
VACUUM CLEANER CONNECTION HAVING RECIPROCATING COUPLING MEANS
Peter Lashta, Montreal, Quebec, Canada, assignor to Aktiebolaget Electrolux, Stockholm, Sweden, a corporation of Sweden
Filed Apr. 1, 1958, Ser. No. 725,737
1 Claim. (Cl. 285—7)

This invention relates to coupling mechanisms, and more particularly to devices for interlocking tubular members which are adapted for endwise engagement.

An application with which the invention is particularly, although not exclusively, concerned is that of connecting cleaning attachments to the wands or mobile tubular handles of vacuum cleaners.

Certain types of vacuum cleaners, as is known, include flexible hoses connected at their free extremities to wands or rigid tubular members. These vacuum cleaners are also known to employ a variety of cleaning attachments which are selectively connected to the associated rigid tubular members for different cleaning operations.

For effecting a ready engagement and disengagement of cleaning attachments and wands, attachments have heretofore been provided with tubular portions for the peripheral and frictional engagement of wands. These tubular members or wands, however, eventually, become distorted or else wear to such an extent that they are no longer frictionally engageable or else they permit leaks in what are preferably hermetically sealed systems.

Effecting a positive connection between tubular portions of cleaning attachments and wands has also been practiced. Thus, for example, hooks operatively associated with ledges or rims have been employed as locking mechanisms for tubular members. These hooks, however, usually become loose and render the associated locking mechanisms ineffective.

It is an object of the invention to provide for the improved engagement of tubular members by means which avoid the deficiencies noted above.

It is moreover an object of the invention, in providing for an improved engagement, to provide also for the ready disengagement of tubular members.

Furthermore, the invention contemplates that tubular members in various applications need be repeatedly brought into and out of engagement. Consequently, a further object of the invention is to provide an improved structure which is substantially unaffected by repeated use.

Another known form of coupling or locking mechanism provides for apertures in vacuum cleaner wands which apertures are engaged by buttons mounted on leaf springs associated with cleaning attachments. For purposes of mechanical strength and for maintaining a good vacuum, it is, however, desirable to maintain the wands imperforate.

Accordingly, a further object of the invention is to provide its improvements without deleteriously affecting mechanical strength of, or the maintaining of a good vacuum in, engaged tubular members.

To achieve the above and other objects, the invention contemplates the coupling of two tubular members in endwise engagement whereby an end of one member is inserted within an end of the other member. In accordance with a preferred embodiment of the invention, a wedging or sliding member, which will hereinafter generally be designated as a "wedge" or "slide," is positioned so as to be capable of extending into the interior of the outer tubular member. This wedge or slide is yieldably supported in such a manner that it is displaced radially outward by the insertion of the inner tubular member. Moreover, the wedge is supported so as to respond to forces tending to extract the inner tube by being displaced radially inward to engage the inner tube with increasing pressure and prevent its extraction. Provision is further made by the invention for the manual control of the wedge to enable an unlocking of the tubular members as desired.

It will be understood from the aforegoing brief description of an embodiment of the invention that the applications thereof are not limited to vacuum cleaner attachments and that the invention has various possibilities of utility.

The invention will be more clearly understood from the following detailed description of its preferred embodiment as illustrated in the accompanying drawing in which:

FIGURE 1 is a perspective view of a vacuum cleaner attachment with a wand coupled thereto by means of a mechanism provided in accordance with the invention;

FIGURE 2 is a sectional view along line 2—2 of FIG. 1 but with the wand disconnected;

FIGURE 3 is a partial sectional view of the structure of FIG. 1 with the wand in engagement with the locking mechanism;

Figure 4:
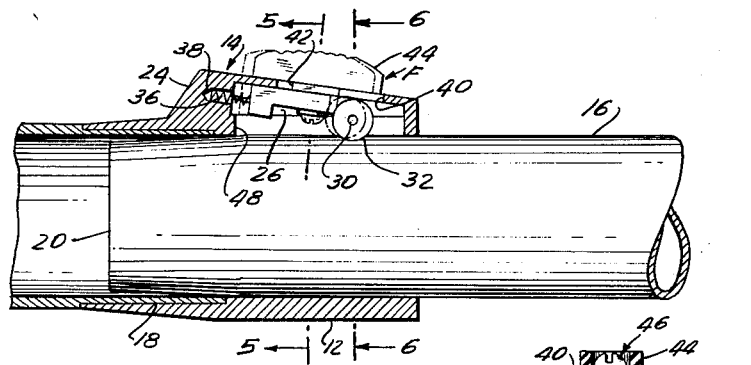
FIGURE 4 is a view similar to that of FIG. 3 illustrating the wedge and manual control as mentioned above and indicating the operation required for extraction of the wand.

The structure shown in perspective in FIG. 1 includes a conventional cleaning attachment 10 having a tubular portion 12 on which is mounted a coupling or locking mechanism 14 which provides for a controlled engagement of a wand or rigid tubular member 16 (shown in part). The locking mechanism 14 provides, by means of internal elements hereinafter referred to in greater detail, for a detachable but very firm engagement of the wand 16. In fact, this engagement is increased by forces tending to extract the wand from tubular portion 12 other than when removal is desired.

FIGS. 2 and 3 illustrate the internal elements of the mechanism 14 in detail before and after the wand has been inserted into tubular portion 12. Before these details are examined, however, it is to be noted that the tubular portion 12 may in fact be a member separate from the attachment 10 to which it may be welded or otherwise affixed along engaging surfaces 18. Moreover, it will be noted that the wand 16 is provided with a tapered section 20 to aid in providing for the insertion of the wand into portion 12.

Figure 7:
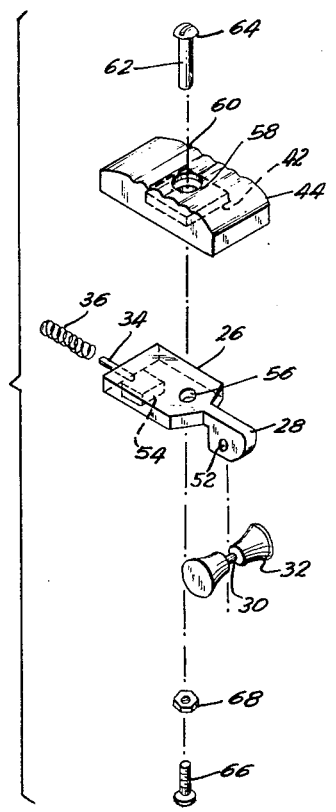
FIGURE 7 is an exploded view of the wedge and control mechanisms illustrating the details thereof.

The mechanism 14 as shown in FIGS. 3 and 7 includes an inclined guide 22 which is a part of a housing 24. Further included is a rigid body member 26 to which is connected a yoke 28 accommodating an axle 30 which supports wheels 32.

A pin 34 is connected to member 26 at one end thereof. The pin 34 is engaged by a compression spring or resilient member 36 one end of which is supported in a bore 38 in housing 24. The housing 24 defines a slot or track 40 in which rides a lug 42 on the bottom of a manual control knob or switch 44. The knob 44 is firmly engaged with the member 26 by means of a bolt assembly 46 extending through the slot 40.

The rigid body 26 and the yoke 28 constitute a portion of a slide or wedge which is fixed to and moves on the inclined guide 22 along a predetermined path defined by the track 40. An axial displacement of the slide or wedge relative to tubular portion 12 due to the radial and axial inclination of the guide relative to portion 12 causes a radial displacement of the wedge. Thus, when the slide or wedge is moved to the left in FIG. 2, it is also displaced radially outward relative to the axis of portion 12; when the slide or wedge is axially displaced to the right, it is radially displaced inwardly.

The wheels 32 constitute tube engaging members for engagement with the wand 16. These members are displaceable along with the wedge between positions in at least one of which they are within the periphery of portion 12 or, in other words, they penetrate into the interior of this tubular member. For permitting this movement of the tube engaging portions, the tubular portion 12 defines an axially aligned slot 48. Slot 48 and locking mechanism 14 are positioned on the end portion of tubular member 12 which is intended to engage the wand 16.

In order to enable the wand 16 to enter the tubular portion 12 freely, the wedge is yieldingly supported on the guide or support 22. The spring 36 resiliently urges the wedge into the position whereat wheels 32 penetrate into portion 12, but the insertion of the wand 16 urges the wedge to the left as shown in FIG. 3.

In FIG. 3, the wedge has compressed the spring 36 which is prevented from buckling by the cooperative endeavors of the pin 34 and the bore 38. The wedge is moved to this position by the rolling of the wheels 32 on the wand 16 or by frictional engagement therebetween should the wheels fail to roll. It is this same rolling or frictional action which enables the locking mechanism 14 to perform the function of preventing an accidental extraction of the wand 16.

Preferably, the wheels 32 engage the wand 16 on the portion thereof which is not tapered. Consequently, any motion of the wand 16 to the right in FIG. 3 will tend to urge the wedge to the right at the same time. This motion of the wedge, however, displaces this member radially inward whereupon the wheels 32 are urged with increased force against the wand. The extraction of the wand is thus prevented.

How the wand 16 can be purposefully extracted is shown in FIG. 4 wherein the wedge and the control 44 are shown displaced to the left (the dotted line showing). This displacement is due to an external and generally manually applied force F acting on the knob 44. The wheels 32 are thus displaced radially outward and ultimately lose contact with the wand 16 which can then be removed with ease.

Figure 5:
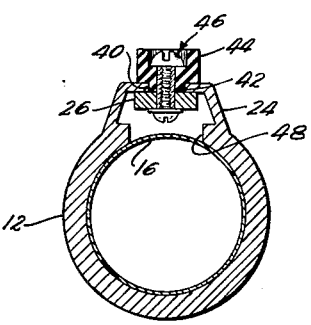
FIGURE 5 is a sectional view along line 5—5 of FIG. 4.
Figure 6:
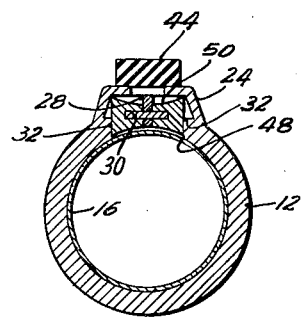
FIGURE 6 is a sectional view along line 6—6 of FIG. 4.

The motion of knob 44 is controlled by the accommodation of the lug 42 in the slot 40 of housing 24. As shown in FIG. 5, this lug rides along the sides of the slot without play so that only a longitudinal displacement of the knob 44 is possible. FIG. 6 indicates that wheels 32 are similarly accommodated in slot 48.

FIG. 6 also indicates another important feature of the invention. Specifically, this figure shows that the wheels 32 include contoured portions 50 which define, at least substantially, the contour of wand 16. This feature enables the distribution of forces applied to the wand 16 to avoid or minimize the possibility of deforming the same.

The elements of the wedge and control mechanisms are shown most clearly in FIG. 7. In this figure, it can be seen that the rigid member 26 is a flat elongated body. Its length is, of course, less than that of the guide 22 (FIG. 2) so as to permit movement therein. The yoke 28 is integral with the body 26 and both can be constructed preferably of a metal such as steel to resist wear. The yoke 28 defines an opening 52 which accommodates the axle 30 supporting wheels 32 and a lug 54 provides a bore in which is housed pin 34 for engaging helical spring 36. The body 26 also defines a bore 56 which enables engagement with the knob 44 on which is positioned a lug 42, these members preferably being integrally molded of plastic. The knob 44 is provided with a bore 58 engageable by the bolt assembly 46 and with serrations 60 to facilitate manipulation thereof. The wedge and control assembly is integrated by the aforenoted bolt assembly 46 which comprises an internally threaded sleeve 62 with a slotted head 64, a threaded bolt 66 and a washer 68.

Referring to the above-described structure in its entirety, it will be noted that repeated insertions and extractions of the wand and attendant wear, if any, will have little or no effect on the operation of the device. This is a consequence of the fact that only an increased radial displacement of the wedge is required to account for wear or distortion. Wear and distortion are, however, minimized due to the conforming of the wheels or tube engaging members to the contour of the wand. It will be readily appreciated that the greater the magnitude of the force tending to extract the wand from its inserted position, the greater the force with which the wedge is applied to the wand. Thus, engagement of the wand is automatically controlled. The manual control provided is both convenient and simple to operate and, moreover, does not include parts which can impair the operation of the device even if worn.

There will now be obvious to those skilled in the art many modifications and variations of the structure set forth which do not depart essentially from the scope of the invention as defined in the following claim.

What is claimed is:

An outer tubular member within which an inner tubular member is fitted telescopically, the outer tubular member having an opening in the wall thereof which overlies the inner tubular member when it is fitted telescopically within said outer tubular member, a housing fixed to the outer tubular member and overlying the opening therein, the housing projecting exteriorly of the outer tubular member, the wall of the housing opposite said opening being inclined at an acute angle to the longitudinal axis of the outer tubular member and having substantially parallel inner and outer surfaces, said wall having a passageway extending lengthwise of the outer tubular member, a slide located in the passageway for longitudinal reciprocation therein and having opposing longitudinally extending edges which are slotted to receive portions of the inner and outer parallel surfaces of said wall which are adjacent said passageway and form a track for said slide, radially inwardly extending engaging means on the under side of the slide for frictionally engaging the inner tubular member, the slide being movable in the passageway between a first position in which the engaging means is spaced radially outward from the inner tubular member and a second position in which the engaging means extends radially inward through the opening into frictional engagement with the inner tubular member, means including a coil spring between the one end of the housing and the slide for resiliently biasing the slide toward its second position at the opposite end of the housing, and a part carried by the slide which is accessible exteriorly of the housing for manually moving the slide toward the one end of the housing against the biasing action of the spring.

References Cited in the file of this patent

UNITED STATES PATENTS

| 1,175,438 | Gzupkaytie | Mar. 14, 1916 |
| 1,379,165 | Burns et al. | May 24, 1921 |
| 2,062,628 | Yannetta | Dec. 1, 1936 |
| 2,348,611 | Davidson | May 9, 1944 |
| 2,416,859 | Vining et al. | Mar. 4, 1947 |
| 2,457,908 | Meyerhoefer | Jan. 4, 1949 |
| 2,563,423 | Samothrakis | Aug. 7, 1951 |
| 2,806,722 | Atkins | Sept. 17, 1957 |

FOREIGN PATENTS

| 286,304 | Italy | June 8, 1931 |
| 515,200 | Canada | Nov. 26, 1954 |